Feb. 3, 1942.   R. S. NELSON   2,271,565
ABSORPTION REFRIGERATING APPARATUS
Filed April 2, 1931   3 Sheets-Sheet 3
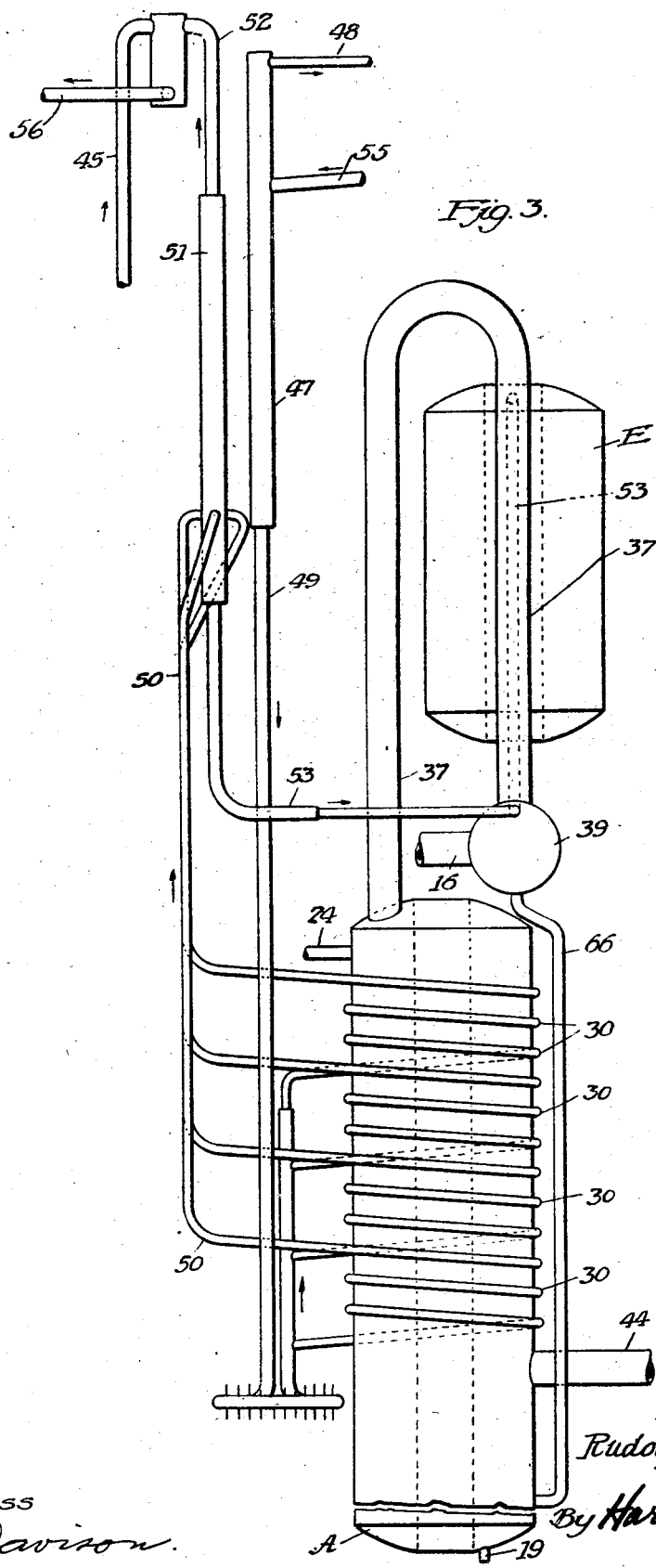
Inventor
Rudolph S. Nelson
By Harry S. Dinases
Atty.
Witness
R B Davison.

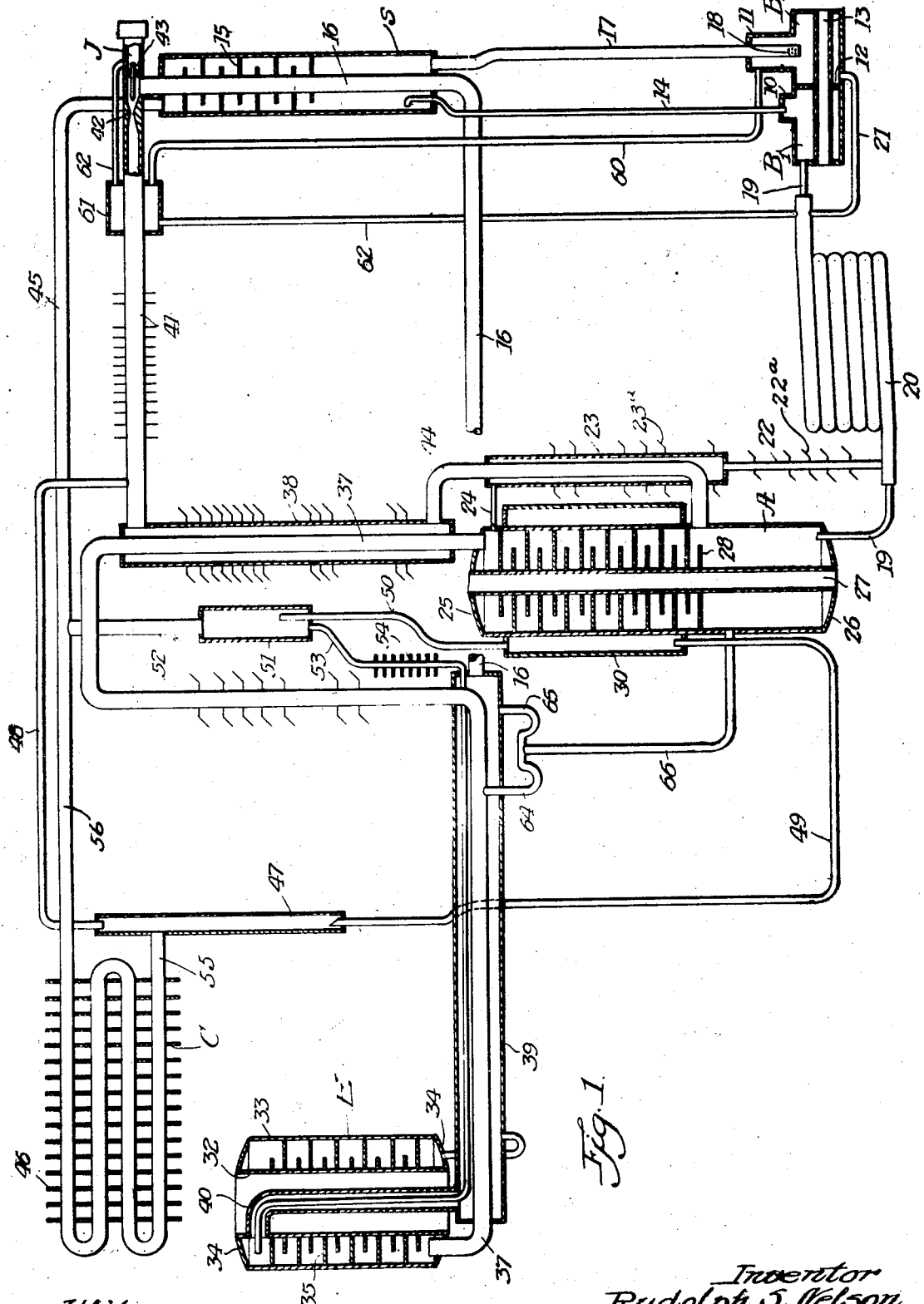

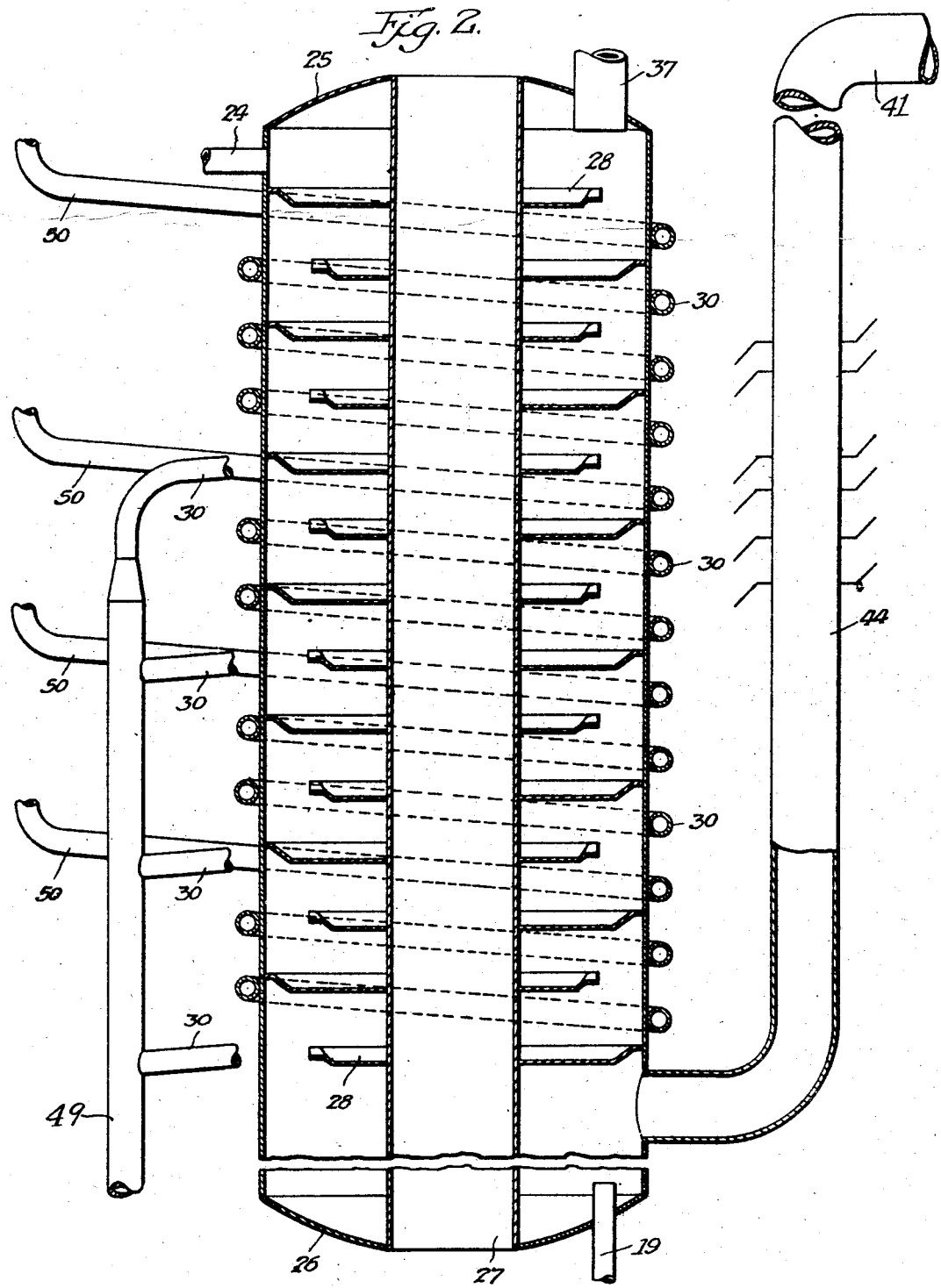

Patented Feb. 3, 1942

2,271,565

UNITED STATES PATENT OFFICE 2,271,565

ABSORPTION REFRIGERATING APPARATUS

Rudolph S. Nelson, Rockford, Ill., assignor to The Hoover Company, North Canton, Ohio, a corporation of Ohio Application April 2, 1931, Serial No. 527,146

25 Claims. (Cl. 62—119.5)

This invention relates to absorption refrigerating apparatus and more particularly to the manner of cooling certain parts thereof.

In absorption refrigerating apparatus of the household type, it is necessary to confine the apparatus to a limited space at the side or back of the cabinet. This offers no serious problem where the apparatus is water cooled but in attempting to design air cooled machines, considerable difficulty has been experienced because of the fact that the limitations in space and the necessary compactness of the unit prevent the free circulation of air over the parts which must give up heat to the air. A particular difficulty arises in attempting to cool the absorber by air since it must be of such shape as to provide an extended surface on the inside for bringing the absorption solution and the refrigerant to be absorbed into contact with one another and also, must usually be rather definitely located with respect to the evaporator and other parts of the unit.

An object of the present invention is to transmit heat generated in an absorber of an absorption refrigerating system from the absorber to a point on the apparatus where more extended surface may be provided to facilitate the transfer of heat to the air. For example heat may be transferred from the absorber to a condenser on top of the refrigerator cabinet.

Another object is to utilize the fluids normally contained in a refrigerating system for transferring heat from the absorber to other parts of the system.

In accordance with the principles of the invention, these objects may be accomplished by causing the vaporization of refrigerant in a jacket or conduit associated with the absorber, the refrigerant being then conducted to a device such as a condenser so located as to be freely exposed to the air and which may be provided with sufficient heat radiating surfaces to cause the vaporized refrigerant to condense and give up the heat to the atmosphere. It is to be understood that this manner of cooling the absorber is not a refrigerating process in the sense in which that term is usually used. The condensation does not take place at a higher temperature than that at which it is vaporized in cooling the absorber. However, due to the fact that a large amount of heat is taken up in changing the refrigerant from a liquid to a vapor state, this means provides a convenient and practical way for maintaining the absorber at a temperature only a few degrees above that of the atmosphere.

Another object of the invention is to provide improved means for circulating an inert gas between the evaporator and absorber of an absorption refrigerating apparatus.

Other objects and advantages reside in the novel arrangement and construction of parts, as the absorber and evaporator and in the method of operating the system, as will be apparent from the following description of the invention, taken in connection with the accompanying drawings, in which Fig. 1 is a diagrammatic representation of a system adapted to carry out the principles of the invention, the parts being spread out or extended for the purposes of illustration, Fig. 2 is a vertical cross sectional view of an absorber suitable for use in a system like that diagrammatically shown in Figure 1, and Fig. 3 is a vertical view of a portion of an apparatus built in accordance with the principles of the invention and illustrating one way of indirectly cooling the absorber.

Referring first to the system shown in Figure 1 of the drawings, an absorption refrigerating apparatus of the type in which an inert gas is used as a pressure equalizing medium is shown as consisting of a plurality of vessels interconnected by conduits. Essentially the system includes a boiler $B_1$, an auxiliary boiler $B_2$, a gas separating chamber S the upper portion of which also acts as a rectifier, an absorber A, an evaporator E, a jet J for facilitating circulation of gases between the evaporator and absorber, a condenser C and various heat exchangers, conduits and small auxiliary vessels which will be referred to hereinafter.

The main boiler $B_1$ and the auxiliary boiler $B_2$ may be formed integrally from a closed cylinder provided with small domes 10 and 11, the cylinder being divided at its center by a partition 12. A tube 13 adapted to receive an electric cartridge heater or other suitable heating device extends thru the partition 12 and thru the end walls of the cylinder so as to provide means for heating both boilers. As is clearly shown in Figure 1 of the drawings the tube 13 is located in the lower portion of the cylinder well below the lower ends of the conduits 14 and 17. By using two cartridge heaters, one in each end of the tube 13, heat supplied to either boiler may be varied as desired. The dome 10 of the main boiler $B_1$ is connected to the gas separating chamber by a small tube 14. This tube is preferably of about one quarter of an inch in diameter so that it may function as a pump of the type now well known in the art in which the formation of bubbles of gaseous refrigerant in the dome 10 lifts liquid from the boiler B₁ into the gas separating chamber S as the bubbles pass upwardly thru the tube 14.

The gas separating chamber S is shown as consisting of a cylindrical vessel with a plurality of staggered baffle plates 15 at its upper portion. A conduit 16 extends centrally thru the gas separating chamber but is not connected to the interior thereof. The purpose of locating the gas conduit 16 in the gas separating chamber is to cause an exchange of heat between gas therein and fluid in the chamber, as will be explained hereinafter. The lower end of the gas separating chamber is provided with an outlet conduit 17 which conveys liquid into the auxiliary boiler B₂. The lower end of this conduit 17 which terminates in the dome 11 of the boiler B₂ is preferably provided with a number of small perforations at its lower end as shown at 18.

A liquid heat exchanger should be provided at one side or just below the boilers B₁ and B₂. As shown it is made up of a plurality of concentrically arranged pipes 19 and 20 bent into the form of a coil. The pipe 19 connects and conveys liquid from the lower end of the absorber A to the boiler B₁. Liquid is conveyed to the outer pipe 20 of the heat exchanger from the boiler B₂ through the conduit 21 and is conveyed away from the outer pipe 20 thru a conduit 22 to the outer chamber 23 of another heat exchanger from which it flows thru the pipe 24 into the top of the absorber A.

The pipe 22 is provided with heat radiating fins 22ᵃ as shown for bringing the temperature of the liquid as near to the temperature of the air or cooling medium before it enters the heat exchange vessel 23. The vessel 23 may also be provided with fins as indicated at 23ᵃ.

The absorber A may be constructed as diagrammatically shown in Figure 1 and as shown more in detail in Figure 2. It consists of a cylindrical vessel, vertically disposed, and having end plates or heads 25 and 26. In order to provide it with as much heat radiating surface as possible a pipe 27 extends vertically from end to end thru the center so as to provide a passage for air. Baffle plates or trays 28 are arranged in staggered relation in the upper portion.

Because of its limited size and location, sufficient heat cannot be transferred from the absorber directly to the air around it. In accordance with the invention, some heat is transferred to liquid refrigerant brought into heat exchange relation with the fluids in the absorber. Figure 1 diagrammatically shows a jacket 30 surrounding the upper portion of the absorber for this purpose, while Figure 2 illustrates an arrangement of pipes coiled around the outer wall of the absorber as an alternative arrangement. These coils of pipe which are also designated 30 may be supplied with refrigerant from a common pipe 49. The pipes 30 might be located inside instead of outside of the absorber if desired.

The evaporator is purposely designed to absorb as much heat as possible from the chamber to be cooled while occupying a small space. To this end it is made of two concentric cylinders or pipes 32 and 33 and annular end plates 34 welded or otherwise secured thereto. A plurality of baffle plates or trays 35 which may be similar to the plates 28 in the absorber, are mounted on the inside of the evaporator.

Conduits are provided for circulating gases between the absorber A and the evaporator E. A gas pipe 37 conveys gases from the top part of the absorber to the lower part of the evaporator. This pipe 37 first extends vertically upward above the absorber, through a jacket 38 and then extends downwardly and thru a jacket or outer pipe 39 and a gas heat exchanger arranged horizontally. This downwardly extending portion of the pipe 37 is provided with heat radiating fins and may be in heat exchange with pipe 38 as shown or may discharge heat to a cooling medium or both. The gas conduit 40 is connected to the upper portion of the evaporator for conveying gas from it to the jacket 39 of the gas heat exchanger referred to. From there a conduit 16, shown partly broken away for the purposes of illustration, conducts the gases thru the center of the gas separating chamber S, as mentioned above, and into the conduit 41 near the point where the jet J is associated with it. At this point the pipe 41 is provided with a Venturi restriction 42. A nozzle 43 drives the gases from the conduit 16 thru the conduit 41 into the jacket 38 and from there thru the conduit 44 part of which passes thru the chamber 23, back into the absorber A below the baffle plates 28. In accordance with known practice, any suitable heat exchanger may be used for the transfer of heat from the gases in the pipe 37 to those in the jacket 39.

As stated above both gas and liquid are conveyed from the main boiler B₁ into the gas separating chamber S. As also explained the liquid leaves this chamber thru the conduit 17. The gas on the other hand passes upwardly across the baffle plates 15 and is rectified. It then flows thru the conduits 45 and 56 to the condenser C which is shown as an air cooled condenser made up of a reversely bent pipe provided with a plurality of radiating fins 46. Upon the gas giving up its heat to the surrounding atmospheric air at the condenser, it is condensed and flows as a liquid thru the pipe 55 into a small vertically disposed chamber 47. Any gas which is not condensed in the condenser C is also conveyed to the vessel 47 and from there flows back into the gas circuit by a conduit 48 connecting the chamber 47 to the gage pipe 41.

The condensate collecting in the vessel 47 does not flow directly to the evaporator, as it does in the ordinary refrigerating system of this type but flows into the jacket or coils 30 around the absorber so as to provide means for indirectly cooling the absorber. Fig. 3 shows a modified manner of constructing the conduits and associated parts which make up this cooling system while Figure 1 illustrates how these parts may be connected with the remainder of the apparatus.

For conducting liquid refrigerant from the condenser to the coils 30 a U-pipe 49 is provided. This pipe extends to a point below the absorber where the cooling air is at a lower temperature than that prevailing around the condenser. Cooling fins may be provided on the lower portion of the conduit 49 to bring the conduit to as low a temperature as possible before it enters the coils 30.

As heat is absorbed by the liquid refrigerant in the jacket or coils 30, a portion is vaporized and passes upwardly thru one or more small conduits 50 (shown as four in Figures 2 and 3) which function as gas lift pumps to pump the liquid up into a small gas separating chamber 51 located above the absorber.

From the gas separating chamber 51 the refrigerant vaporized in the jacket 30 passes upwardly thru the conduit 52 to join that flowing from the gas separating chamber S to the condenser C thru the conduit 45. The liquid brought to the gas separating chamber 51 is carried away through the conduit 53 connected to the bottom thereof. Immediately below the gas separating chamber 51 the conduit 53 may be provided with radiating fins 54 (Fig. 1) so as to bring the liquid refrigerant therein to as low a temperature as possible by air cooling. Conduit 53 then passes thru the outer jacket 39 of the gaseous heat exchanger and upwardly thru the gas conduit 40 to the top of the evaporator. The gas conduit 40 and the refrigerant supply conduit 53 may extend thru the inner cylinder 32 of the evaporator as shown in Figure 1 to effect a saving in space.

For supplying gas to the jet J the conduit 60 is connected to the dome 11 of the auxiliary boiler B2 and to a small gas separating chamber 61 surrounding the gas conduit 41 at a point near the jet. The conduit 60 need not function as a vapor lift pump but no harm is done if it does so function. Since, however, the gas separating chamber 61 is cooled somewhat by the exchange of heat with the gas conduit 41, any liquid brought to the chamber will be cooled and carried away thru the conduit 62 to the outer pipe 20 of the liquid heat exchanger and from there flow thru the conduit 22 into the absorber. In this way relatively dry gas is delivered thru the conduit 63 to the nozzle 43 of the jet.

While it is intended that gases pass thru the conduit 37 and jacket 39 of the gaseous heat exchanger, some liquid will collect in these devices unless drains are provided. This would prevent the operation of the apparatus. Accordingly a small U-shaped conduit is connected to each of these devices as shown at 64 and 65 and to a drain pipe 66 which may be connected to the liquid conduit 19 at the bottom of the absorber or to the lower portion of the absorber as shown.

In Figure 3, the absorber of Figure 2 is shown in cross section and the parts designated by the reference characters of Figures 1 and 2. The only structural difference in the arrangement of Figure 3 from that diagrammatically indicated in Figure 1 resides in the fact that in Figure 3, the heat exchanger vessels 23 and 38 are eliminated, the conduit 22 passing directly from the liquid heat exchanger 20 to the top of the absorber and the gas conduit 41 being directly connected to the gas conduit 44. With this arrangement the conduit 44 should be effectively cooled by heat radiating fins.

The apparatus may be charged and operated as follows:

In this apparatus, ammonia, water and hydrogen may be used as the fluids although certain features of the invention are not limited to their use or even to apparatus of the type in which inert gas is employed. These fluids are placed in the apparatus thru suitable charging valves, not shown. Commercial aqua ammonia, which has a concentration of about 30% by weight may be first placed in the apparatus until it fills the boiler and the lower portion of the absorber which acts as a reservoir. Anhydrous ammonia may then be added to sweep air out of the remainder of the apparatus and to raise the concentration so that during operation the average concentration of the solution will be in the neighborhood of 20 to 25%. Hydrogen may then be forced into the evaporator or the absorber until the pressure therein is in the neighborhood of 300 pounds per square inch, it being desirable to operate the apparatus at a total pressure of from 300 to 350 pounds per square inch because of the fact that the condenser and the absorber are intended to operate at a temperature of from 20 to 30 degrees above that of the atmosphere which may be, for example, at a temperature from 75 to 100 degrees Fahrenheit. After the charging valves have been closed, heat may be applied to the boiler. The pressure may vary in either direction from the amount indicated above, depending upon temperature conditions. Accordingly it may be necessary to trim the apparatus, that is, either add or remove hydrogen or ammonia or water until the total pressure is in slight excess of that theoretically necessary to condense ammonia at the temperature prevailing in the condenser.

As heat is applied to the boiler $B_1$ ammonia gas will be expelled from the solution therein and circulation of the absorption solution will take place as follows:

From the boiler $B_1$ the solution passes upwardly thru the vapor lift pump 14 thru the gas separating chamber S downwardly thru the conduit 17 thru the boiler $B_2$, conduit 21, outer pipe 20 of the liquid heat exchange, pipe 22, jacket 23 and pipe 24 into the absorber where after trickling down over the baffle plates 28 it passes back to the boiler $B_1$ thru the conduit 19.

The ammonia gas expelled in the boiler $B_1$ passes upwardly thru the vapor lift pump 14 and the gas separating chamber into the conduit 45 which with the pipe 56 conveys it to the condenser C where it is condensed and flows thru the pipe 55 into the vessel 47. From there it flows downwardly thru the conduit 49 and into the jacket or coils 30 around the absorber. In the jacket 30 a portion of the liquid ammonia is vaporized and carries the remainder up into the gas separating chamber 51 from which it flows downwardly thru the conduit 53 and into the evaporator where it is vaporized to produce a cooling effect.

The portion of the refrigerant vaporized in the jacket 30 passes upwardly thru the conduit 50 into the gas separating chamber 51 and from there back to the condenser where it is again liquified, this path being provided by the conduit 52 and pipe 56.

The absorber is thus cooled partly by transfer of heat directly to the atmosphere or cooling medium and partly by transfer to the refrigerant in the jacket 30 which in turn transfers it to the atmosphere. Part of the heat transferred to the refrigerant is used to vaporize a portion thereof and a part is carried away by the convection of the liquid.

The hydrogen is circulated between the evaporator and the absorber under the influence of a number of factors, chief among which is the impulse imparted to it by jet J and the heating and cooling of the gases in different parts of the apparatus to change its density. Starting with the absorber where the hydrogen is heated somewhat by the heat generated in absorbing the ammonia, the hydrogen passes upwardly thru the pipe 37 where it is further heated by the gases in the jacket 38. It then flows downwardly while being air cooled and thru the gas heat exchanger into the lower part of the evaporator. After rising thru the evaporator and absorbing ammonia the hydrogen flows thru the pipe 40, outer jacket 39 of the gas heat exchanger from which it is conveyed thru the gas separating chamber S by the pipe 16. The ammonia vapor passing thru the gas separating chamber being at a relatively high temperature since it has just come from the boiler, the gases in the pipe 16 are heated thus causing them to rise. This exchange of heat also facilitates rectification in the upper part of the gas separating chamber as the heat is transferred from the ammonia vapor passing over the baffle plate to the gases in the pipe 16. From the pipe 16 the gases are blown thru the conduit 41 by the jet and into the jacket 38 where some heat is given up to the gases in the pipe 37. The gases then flow thru the pipe 44 where they are further cooled by absorption solution rising thru the jacket 23, and flow into the lower portion of the absorber beneath the baffle plates 23 therein.

It will be seen that with this arrangement the auxiliary agent, such as hydrogen, might be circulated solely due to the influence of heat applied to or removed therefrom at different parts of the surface, although in the form shown circulation is augmented by the jet J. Upon the inert gas leaving the evaporator thru the conduit 40 it passes horizontally thru the heat exchange vessel 39 where it is heated. It is further heated in the pipe 16, then cooled in the pipes 41, 38 (Fig. 1) and in the pipe 44.

There are certain novel advantages resulting from the heating of the inert gas in the vessel 39 and the cooling of the same in the pipe 41. As shown these two conduits are horizontal whereas the conduits 16, 38 and 44 are vertical. Circulation of the inert gas could be effected of course, solely by heating and cooling the vertical conduits but the density gradient is materially increased if the inert gas is heated or cooled as the case may be before it enters these vertical conduits. This is apparent when it is noted that the factors which promote circulation of gas involve the height or head of the columns of gas of different density. If the gas entering the lower portion of the conduit 16 is warmed and that entering the upper portion of the jacket or vessel 38 is cooled before it enters these devices the effective height of the column is increased so much because otherwise the gas would have to pass some distances therein before any appreciable temperature change and hence before any appreciable circulating force would materialize.

The machine described above adapts itself well for utilization in connection with a cabinet so arranged that cooling air is caused to flow by convection over the parts to be cooled due to the arrangement of the heat radiating surfaces therein.

While only a few embodiments of the invention have been shown and described herein it is obvious that many changes may be made without departing from the spirit of the invention or the scope of the annexed claims. An example of a contemplated change resides in connecting the cooling jacket or coils of the indirect cooling system of the absorber in parallel instead of in series with the means for conducting refrigerants from the condenser to the evaporator.

I claim:

1. In a refrigerating system, a condenser, an absorber, an evaporator and an arrangement for conducting refrigerant from the condenser to the evaporator and for facilitating the removal of heat from the absorber, said arrangement comprising conduit means for conducting refrigerant from said condenser into heat exchange relation with said absorber to thereby cause a portion of said refrigerant to evaporate as it takes up heat from the absorber, a gas separating chamber located above the absorber, a plurality of vertically disposed small pipes connected to said conduit means and to said gas separating chamber for conducting the evaporated portion of said refrigerant to said chamber and adapted to operate as pumps for conveying the unevaporated portion of said liquid upwardly into said chamber as the evaporated portion passes therethrough, means for conducting the unevaporated portion of said refrigerant from said chamber to said evaporator and means for conducting the evaporated portion from said chamber back to said condenser.

2. In an absorption refrigerating system, an arrangement for cooling a part thereof, said arrangement including a plurality of conduits connected in parallel for conducting a liquid into proximity with fluids in said part, means for causing the transfer of heat from said fluids to said liquid to thereby cause evaporation of a portion of the liquid in said conduits and thereby lifting the remainder of said liquid to a higher level upon the passage of the gaseous portion upwardly through said conduits.

3. In a continuous absorption refrigerating system in which an inert gas is employed, the combination with an absorber of an evaporator comprising a vertically disposed outer cylinder, a plurality of baffle plates horizontally arranged therein, a vertical pipe inside said outer cylinder and adapted to conduct a current of air into heat transfer relation with the central portion of said baffle plates, end closure means connecting said pipe to said outer cylinder and an inert gas conduit connecting the evaporator to the absorber, said gas conduit having a portion located in said pipe and connected to the space between said cylinder and said pipe.

4. In a continuous absorption refrigerating system, the combination with a condenser of an evaporator comprising a vertically disposed outer cylinder, a plurality of baffle plates horizontally arranged therein, a vertical pipe inside said outer cylinder and adapted to conduit a current of air into heat transfer relation with the central portion of said baffle plates, end closure means connecting said pipe to said outer cylinder and a liquid refrigerant supply conduit connecting the condenser to said evaporator, said conduit having a portion located in said pipe and connected to the space between said cylinder and said pipe.

5. In an absorption refrigerating system of the type in which an inert auxiliary agent is employed as a pressure equalizing medium, the combination of a main boiler, a gas separating chamber, an absorber, an evaporator, a jet for driving the inert gas in a given direction to promote circulation thereof and conduit means for providing an absorption liquid circuit from said boiler to said gas separating chamber, from said gas separating chamber to said absorber and from said absorber back to said main boiler, an auxiliary boiler forming part of the conduit means for conveying absorption liquid from the gas separating chamber to the absorber, said auxiliary boiler being adapted to expel additional vapor from the solution, in excess of that expelled in the main boiler before the solution passes to the absorber and means for conducting vapor generated in said auxiliary boiler to said jet.

6. In an absorption refrigerating system, the combination substantially as defined in claim 5 wherein said auxiliary boiler is located a considerable distance below said gas separating chamber to provide a large head of liquid between said gas separating chamber and said auxiliary boiler to exert considerable pressure upon the vapor delivered to said jet.

7. In an air cooled absorption refrigerating system, means for transferring heat from a major element to an element so located as to permit rapid heat dissipation to the air whereby heat is dissipated from the latter to indirectly cool the former, said means including a plurality of small pipes located at spaced points on said major element, conduit means for conveying liquid from said heat dissipating element to each of said small pipes and conduit means for conveying vapor from said small pipes to said heat dissipating element.

8. In a continuous absorption refrigerating system, the combination with a generator, an air cooled condenser and an evaporator of an absorber having means therein for distributing absorption liquid over a large area, means for circulating inert gas between said evaporator and said absorber and for bringing the gas into intimate contact with the large area of absorption liquid in said absorber as it passes therethrough, means for causing cooling air to flow through a central portion of said absorber to take up heat from said absorption liquid distributing means and means for cooling an outside portion of said absorber, said last mentioned means including a plurality of conduits for passing condensed refrigerant from the air cooled condenser into heat transfer relation with the outer portion of said absorber.

9. The method of cooling a refrigerating system by an ultimate cooling medium situated below a heat rejecting portion of the system which comprises vaporizing a portion of a heat conveying liquid by heat exchange with the heat rejecting portion, utilizing the vapor to raise the remaining liquid to a higher level, condensing the vapor and circulating said heat conveying liquid from the higher level by gravity first in heat exchange relation with the ultimate cooling medium and then again in heat exchange relation with the heat rejecting portion of the system.

10. The method of cooling a refrigerating system by an ultimate cooling medium situated below a heat rejecting portion of the system which comprises vaporizing a portion of a heat conveying liquid, utilizing the vapor to raise the remaining liquid to a higher level, condensing the vapor and circulating said heat conveying liquid from the higher level by gravity first in heat exchange relation with the ultimate cooling medium and then in heat exchange relation with the heat rejecting portion of the system.

11. In an absorption refrigerating apparatus, a generator, a condenser, an evaporator, an absorber, means to circulate an absorption liquid between said generator and absorber comprising a thermo-siphon conduit extending into the generator and having an opening for communication with the generator, means to heat the liquid within said generator in order to drive off a gas to cause said thermo-siphon to operate, said heating means comprising a flue extending longitudinally through said generator and located within the lower part of said generator in order that the flue will be covered with the liquid within the generator and means for heating said flue, the top of said flue being below said opening.

12. In an absorption refrigerating apparatus, a generator, a condenser, an evaporator, an absorber, means to circulate an absorption liquid between and through said generator and absorber comprising a thermo-siphon conduit extending into the generator and having an opening for communication with the generator, means to drive off a gas from the liquid in said generator in order to cause said thermo-siphon to operate comprising a source of heat, a flue extending longitudinally through said generator, means to heat said flue and means allowing a maximum free surface of the liquid within said generator comprising the location of said flue in the lower part of said generator, the top of said flue being below said opening.

13. Absorption refrigerating apparatus comprising a generator, an evaporator, an absorber, means to circulate an absorption liquid between and through the generator and absorber comprising a thermo-siphon tube extending downwardly into the generator, a flue extending longitudinally through the generator located within the lower part of the said generator, the top of the flue being below the bottom of the thermo-siphon tube and heating means for said flue.

14. In an absorption refrigerating system, a condenser, an absorber, an evaporator and an arrangement for conducting refrigerant from the condenser to the evaporator while facilitating the removal of heat from the absorber, said arrangement including a plurality of small pipes in heat transfer relation with the absorber and conduits connecting said pipes to the condenser and the evaporator.

15. In an absorption refrigerating system, a condenser, an absorber comprising a closed vessel having means therein for distributing absorption liquid over a large area, and means for cooling said absorber including a conduit for passing air through one portion of said absorber and a heat transfer system for transferring heat from another portion of said absorber to said condenser.

16. In an absorption refrigerating system, a condenser, an evaporator, an absorber located below said condenser, said absorber comprising a closed vessel having means for providing an extended surface therein, and means for air cooling said absorber and said condenser, and including a conduit for passing air through a central portion of said absorber, heat radiating fins on the condenser, liquid conduits for conveying condensed refrigerant from the condenser into proximity with the absorber and from proximity with the absorber to the evaporator and a conduit for conveying gaseous refrigerant from proximity with the absorber to the condenser.

17. In an absorption refrigerating system, a vessel containing an absorbent medium, an arrangement including an air-cooled condenser, for indirectly cooling said vessel, a wall of said vessel including a plurality of fluid passages connected in parallel for conducting a volatile liquid in heat exchange with the absorbent medium within said vessel, heat conducting means within said vessel arranged in direct heat transfer relation to said absorbent and to said vessel wall whereby heat of absorption is transferred to said volatile fluid and causes the evaporation of a portion of said liquid in said passages and the elevation of unevaporated liquid in said passages as the vaporized portion passes upwardly through said passages thereby facilitating the uniform cooling of said vessel wall, fluid conducting means connecting the upper portions of said passages and said condenser, and fluid conducting means connecting the lower portions of said passages and said condenser.

18. In an air cooled absorption refrigeration system, means for transferring heat from a major element in which absorption of a refrigerant by an absorbent medium takes place to an element so located as to permit heat dissipation to atmospheric air whereby heat is dissipated from the latter to indirectly cool the former, said means including means constructed and arranged to provide a plurality of small fluid passages in heat exchange relation with said major element, conduit means for conveying a volatile liquid from said heat dissipating element to each of said small fluid passages, and conduit means for conveying vapor generated from said volatile liquid by heat of absorption taking place in said major element to said heat dissipating element for condensation therein, the arrangement being such that at least portions of the vapor produced by the heat of absorption is utilized to circulate unvaporized liquid in said fluid passages and thereby facilitate heat exchange with said major element.

19. In an air cooled absorption refrigeration system, means for transferring heat from a major element in which absorption of a refrigerant by an absorbent medium takes place to an element so located as to permit heat dissipation to atmospheric air whereby heat is dissipated from the latter to indirectly cool the former, said means including means constructed and arranged to provide a plurality of small fluid passages in heat exchange relation with said major element and connected in parallel, conduit means for conveying a volatile liquid from said heat dissipating element to the lower ends of each of said small fluid passages, and conduit means for conveying vapor generated from said volatile liquid by heat of absorption taking place in said major element to said heat dissipating element for condensation therein, said last named means being connected to the upper ends of said fluid passages, the arrangement being such that at least portions of the vapor produced by the heat of absorption is utilized to circulate unvaporized liquid upwardly in said fluid passages and thereby facilitate heat exchange with said major element.

20. The method of cooling an absorption refrigerating system by a volatile cooling medium flowing through a circuit having a portion thereof situated below a heat rejecting portion of the system and in heat exchange relation with a cooling medium, which method comprises vaporizing a portion of a heat conveying volatile liquid by heat exchange with a heat rejecting portion of an absorption refrigeration system, utilizing the vapor so produced to elevate the remaining liquid, condensing the vapor by heat exchange with a cooling medium, and circulating said condensed heat conveying volatile liquid by gravity first in heat exchange relation with a cooling medium below said heat rejecting portion and then in heat exchange relation with the heat rejecting portion of the system.

21. The method of indirectly cooling the absorption zone of an absorption refrigerating system so long as absorption is taking place in said absorption zone, said indirect cooling being carried out by a volatile heat conveying liquid flowing through a circuit having a portion thereof situated below a portion of said absorption zone and in heat exchange with cool air, which method comprises vaporizing a portion of a volatile heat conveying liquid by heat of absorption derived from said absorption zone, utilizing the vapor so produced to circulate the remaining liquid into heat exchange with said absorption zone by gas lift action, condensing the vapor by heat exchange with cool air, and circulating said condensed volatile heat conveying liquid by gravity first in heat exchange relation with cool air below a portion of said absorption zone and then again in heat exchange with said absorption zone.

22. The method of indirectly cooling the absorption zone of an absorption refrigeration system so long as absorption is taking place in said absorption zone, said indirect cooling being carried out by a volatile heat conveying liquid flowing through a circuit having a portion thereof situated below a portion of said absorption zone, which method comprises vaporizing a portion of said volatile liquid in each of a plurality of columns of said liquid in heat exchange relation throughout the major dimension of the absorption zone and by heat of absorption derived therefrom, utilizing the vapor so produced to circulate the liquid through said columns by gas lift action to cool said absorption zone uniformly, condensing the vapor by heat exchange with cool air, circulating said condensed vapor in heat exchange relation with cool air and then distributing the same between said columns in heat exchange with said absorption zone.

23. An absorption refrigeration system including an absorber vessel, said vessel comprising inner and outer concentrically arranged tubular members having the space between the adjacent opposite ends thereof closed to provide an annular absorption chamber therebetween containing an absorbent material, said inner member being open ended, spaced apart heat conducting members arranged in said absorption chamber and in heat conducting relation to one of said tubular members, and means for dissipating heat of absorption from said absorption chamber comprising an air cooled condenser, means providing a plurality of fluid passages in heat exchange relation with said absorption chamber and connected to receive a volatile liquid from said condenser and to return vapor of said liquid to said condenser, said heat dissipating means being so constructed and arranged that vapor formed from said volatile liquid by the heat of absorption serves to circulate the volatile medium along said fluid passages by gas lift action and in heat exchange relation with the absorption chamber to cool said chamber uniformly.

24. In combination with an absorption refrigeration system having an evaporator, means for supplying a volatile refrigerant to said evaporator in liquid form, a vessel comprising concentrically arranged tubular members providing an annular chamber containing absorbent material, means for conducting refrigerant vapor from said evaporator to said vessel for absorption by said absorbent material, means including a volatile liquid for transferring heat of absorption from said vessel to a point spaced therefrom and dissipating the same to atmospheric cooling air comprising an air-cooled condenser, means providing a plurality of fluid passages spaced about one of said tubular members of said vessel and in intimate heat conducting relation therewith, conduit means connecting said condenser in circuit with said fluid passages, the arrangement being such that vapor generated by heat of absorption in said fluid passages causes movement of unvaporized liquid therealong as the vapor flows to said condenser for transfer of heat to the atmospheric cooling air.

25. In combination with an absorption refrigeration system, an upright cylindrical vessel closed at its opposite ends, an open ended tubular member passing centrally through said vessel, a plurality of spaced apart heat conducting plate-like members mounted within said vessel in heat conducting relation to a wall of said vessel, absorbent material in contact with said members, means for transferring heat of absorption to a point remote from said vessel and dissipating the same to a cooling medium comprising means forming a fluid circuit and including a condenser vessel, means providing a plurality of fluid passages connected in parallel and in heat exchange relation with a wall of said vessel, said passages being arranged to receive a volatile liquid from said condenser at their lower ends and to return vapor to said condenser from their upper ends.

RUDOLPH S. NELSON.